No. 637,128. Patented Nov. 14, 1899.
C. L. KINDSFATTER.
BICYCLE BRAKE.
(Application filed June 20, 1898.)
(No Model.)
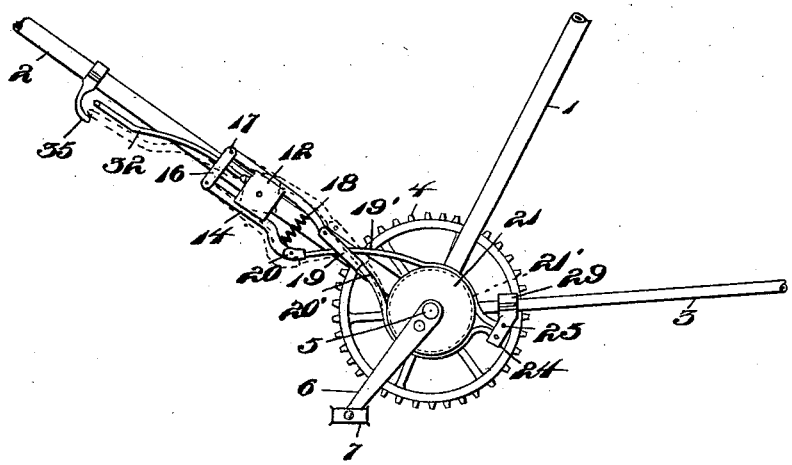
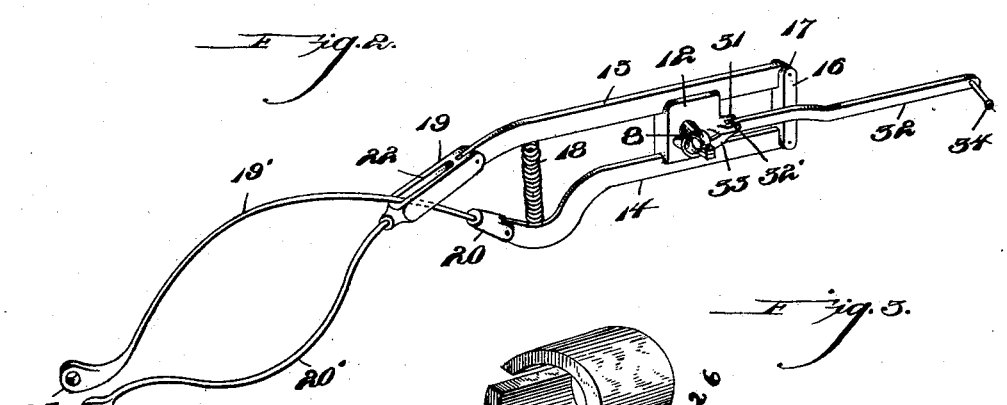
WITNESSES:
INVENTOR
Carl L. Kindsfatter
BY
ATTORNEYS.

UNITED STATES PATENT OFFICE.

CARL LORENZ KINDSFATTER, OF EAST LIVERPOOL, OHIO.

BICYCLE-BRAKE.

SPECIFICATION forming part of Letters Patent No. 637,128, dated November 14, 1899.

Application filed June 20, 1898. Serial No. 683,916. (No model.)

*To all whom it may concern:*

Be it known that I, CARL LORENZ KINDSFATTER, a citizen of the United States of America, residing at East Liverpool, in the State of Ohio, have invented certain new and useful Improvements in Bicycle-Brakes, of which the following is a specification, reference being had therein to the accompanying drawings.

My invention relates to certain new and useful improvements in bicycle-brakes.

The object of my invention is to provide a brake of this character which operates upon a brake-wheel secured to the crank-shaft, stopping the revolution of the sprocket-wheel, thereby preventing the forward or backward movement of the bicycle.

My invention consists in securing to the lower reach-bar post of the frame of the bicycle a pair of lever-operated brake jaws or arms of concaved and convexed form, operating on a brake-wheel secured to the crank-shaft on the opposite side of the frame to the sprocket-wheel, and suitable mechanism, hereinafter described, for operating the same to arrest the movement of the bicycle.

My invention further consists in the novel combination and arrangement of parts hereinafter more fully described, illustrated in the accompanying drawings, and particularly pointed out in the claim hereunto appended.

In the drawings, Figure 1 is a side elevation of my device secured to the frame of the bicycle, showing in dotted lines the brake in an operative position. Fig. 2 is a perspective view of a part of the brake mechanism. Fig. 3 is a perspective view of the securing-clamp for the ends of the jaws, which is secured to the rear fork of the frame. Fig. 4 is a vertical sectional view of the bar which is attached to the lower reach-bar post for securing the brake mechanism thereto.

Referring to the drawings, in which similar reference-numerals indicate corresponding parts throughout the several views, 1 indicates the seat-post; 2, the lower reach-bar post; 3, the rear fork; 4, the sprocket-wheel; 5, the crank-shaft; 6, the pedal-crank, and 7 the pedal.

Secured upon the lower reach-bar post 2, by means of the cap 8 and bolts 9, is a bar 10, which is adapted to have movably secured thereon, by having a central aperture formed therein for the bar 10 to be inserted therethrough and secured thereto by a screw-nut 11, a wedge-block 12. This wedge-block 12 is adapted to be movably secured between the lever-rods 13 and 14 by having elongated slots or grooves 15 formed on its upper and lower ends, in which the lever-rods operate.

The lever-rods 13 and 14 are connected together at one end by the connecting-bar 16, which is pivotally secured to the ends of the lever-rods, as at 17. Arranged between the lever-rods 13 and 14 is a coil-spring 18, which is adapted to secure the lever-rods in an inoperative position when the brake mechanism is not in operation.

Pivotally secured to the opposite ends of the lever-rods 13 and 14 are connecting-irons 19 and 20, which are adapted to have rigidly secured thereto brake jaws or arms 19' and 20', which operate on the brake-wheel 21, which is secured to one end of the crank-shaft. This brake-wheel has a groove formed on its periphery, as shown in dotted lines, as at 21'. The jaws or brake-arms operate in this groove.

The jaw 19' is adapted to operate also through an opening 22, formed in the connecting-iron 19, which is secured, as heretofore stated, to the lever-rod 13. The jaw 19' is of convexed form, while the jaw 20' is concaved. The free ends of the jaws are enlarged and apertured, as at 23, and are adapted to be secured in the apertured extension 24 by means of the bolts or screws 25, the extension being formed integral with the securing-plate.

The securing-plate 26 is adapted to be secured to the rear forks 3 of the frame and is constructed of the two sections 27 and 28, having a part of their ends 29 made semispherical in form, which are adapted to be secured around the parts and frame of the bicycle by the screws or bolts 30, securing the two sections together.

The inner face of the wedge-block has a pair of lugs or extensions 31 cast integral therewith, which extend outwardly therefrom and are adapted to have pivotally secured thereto the operating-rod 32, as at 32', the operating-rod being concave from that point to its end, as at 33, and is adapted to fit under the bar 10. The opposite end of the operating-bar has a foot-bar 34 secured thereto for operating the same. In order to arrest the movement of the operating-bar, a stop 35 is provided therefor, which is suitably secured to the lower reach-bar.

When the bicycle is in motion and it is desired to arrest its movement, the operating-bar 32 is forced downwardly by the rider, which causes the brake jaws or arms 19' and 20' to securely hold the brake-wheel 21 and prevents the crank-shaft, with the sprocket-wheel attached thereto, from revolving.

It is thought that owing to the simplicity of my construction and the operative positions when in use, as shown in dotted lines in Fig. 1, no further explanation as to its operation is necessary.

It will be noted that various changes may be made in the details of construction without departing from the general spirit of my invention.

Having fully described my invention, what I claim as new, and desire to secure by Letters Patent, is—

In a bicycle, the combination of a grooved brake-wheel mounted on the crank-shaft, jaws or brake-arms operating in said groove, an apertured extension adapted to receive the one end of each of the said jaws or brake-arms for securing the same in position, lever-rods connected to the opposite end of the said jaws or brake-arms, means for pivotally connecting the said levers together, a coiled spring mounted between the said levers for normally keeping them in an inoperative position, a grooved wedge-block suitably secured to the bicycle-frame and arranged between the said lever-rods, an operating-rod for the said wedge-block suitably connected thereto, and means for arresting the movement of the said rod, substantially as set forth.

In testimony whereof I affix my signature in the presence of two witnesses.

CARL LORENZ KINDSFATTER.

Witnesses:
JOHN NOLAND,
H. H. PATTERSON.